United States Patent [19]

Mizushima et al.

[11] Patent Number: 4,827,317

[45] Date of Patent: May 2, 1989

[54] TIME INTERVAL MEASURING DEVICE

[75] Inventors: Yoshihiko Mizushima; Yutaka Tsuchiya; Musubu Koishi; Akira Takeshima, all of Shizuoka, Japan

[73] Assignee: Hamamatsu Photonics Kabushiki Kaisha, Shizuoka, Japan

[21] Appl. No.: 66,493

[22] Filed: Jun. 26, 1987

[30] Foreign Application Priority Data

Jun. 27, 1986 [JP] Japan ................................. 61-150762

[51] Int. Cl.⁴ .......................... G01C 3/00; G01C 3/08
[52] U.S. Cl. ............................. 356/73.1; 250/213 VT; 356/5; 368/120
[58] Field of Search .................... 368/120; 356/5, 218, 356/222; 250/213 VT; 357/73.1

[56] References Cited

U.S. PATENT DOCUMENTS

| | | | |
|---|---|---|---|
| 3,229,201 | 1/1966 | Curtis et al. | |
| 3,402,630 | 9/1968 | Blau et al. | 356/5 |
| 3,761,614 | 9/1973 | Bradley et al. | 250/213 VT |
| 3,765,768 | 10/1973 | Budin et al. | 356/5 |
| 3,817,620 | 6/1974 | Suzaki et al. | 356/5 |
| 3,830,567 | 8/1974 | Riegl et al. | 356/5 |
| 3,848,999 | 11/1974 | Dall'Armi | 356/4 |
| 3,897,150 | 7/1975 | Bridges et al. | 356/5 |
| 4,637,733 | 1/1987 | Charles et al. | 368/120 |
| 4,699,508 | 10/1987 | Bolkow et al. | 368/120 X |

OTHER PUBLICATIONS

Abshire, J. B., "Pulsed Multiwavelength Laser Ranging System," 3/82; pp. 1–121.
Bournot, et al., "Propagation of a Laser-Supported Detonation Wave," pp. 257–267.
McGunigal, et al., "Workshop on Laser Ranging Instrumentation-III. GSFC Working Papers".
Alley, C. O., "Proper Time Experiments in Gravitational Fields with Atomic Clocks, Aircraft, and Laser Light Pulses," pp. 363–427.
Bender, P. L., "Laser Measurements of Long Distance," pp. 1039–1045.
Im, K. E., "Estimation of the Differential Pulse Propagation Times in Two-Color Laser Ranging Systems," pp. 143–156.
Slater, L. E. and Huggett, G. R., "A Multiwavelength Distance-Measuring Instrument for Geophysical Experiments," pp. 6299–6303.
Prints Summary, World Patents Index.
McQueen, "Improved System for Measuring the Writing Speed of a Sweeping Image Camera," Rev. S. Inst. Jul. 1983 pp. 875–878.

Primary Examiner—Vincent P. McGraw
Attorney, Agent, or Firm—Finnegan, Henderson, Farabow, Garrett, & Dunner

[57] ABSTRACT

In a device for measuring the time interval between first and second optical pulses, the time interval between the first optical pulse and a first one of the train of reference optical clock pulses which is closest to the first optical pulse, and the time interval between the second optical pulse and a second one of the train of reference optical clock pulses which is closest to the second optical pulse are measured, and the time interval between the first and second optical pulses is calculated according to the time intervals thus measured and the time interval between the first and second reference optical clock pulses.

5 Claims, 1 Drawing Sheet

TIME INTERVAL MEASURING DEVICE

BACKGROUND OF THE INVENTION

This invention relates to a time interval measuring device for measuring the unknown time interval between optical pulses.

In a conventional long distance measuring technique, or typically in a surveying technique, optical interference is utilized for accurate measurement. That is, in the method, a laser beam modulated with an electrical signal is caused to go and return for a distance to be measured, and the laser beam returned is demodulated, so that the phase of the modulating signal is compared with that of the original one. The difference in phase is converted into a time interval, from which the distance is calculated.

Furthermore, a method is also known in the art that an optical pulse is allowed to go and return for a distance to be measured, and the distance is calculated from the period of time required for the optical pulse to go and return for the distance.

However, the conventional method in which the phase comparison is carried out is disadvantageous in that, in the case where the weather conditions of the light transmitting space change with time, the light beam returned changes in amplitude, which results in an error in phase, thus limiting the measurement.

In the latter method in which the time required for an optical pulse to go and return for a distance to be measured is detected to measure the distance, the measurement is substantially free from the change of the amplitude which is caused by the variations of the weather conditions. However, heretofore the method is not sufficiently utilized because there has not been provided means for accurately measuring the difference between the time required for an optical pulse to go for a distance to be measured and the time required for the optical pulse to return for the distance.

If a photo-diode is used as in the conventional method, the time interval between two optical pulses can be measured with an error of about 100 ps. If a streak camera is used, then the time interval can be read with an error of about 1 ps. However, the time required for an optical pulse to go and return for a long distance is longer than that, and for instance a period of time of the order of 100 μs cannot be measured with that accuracy. The reason for this resides in that, in an electrical circuit for determining the time positions of electrical pulses obtained through photo-electric conversion with gate circuits therein and accumulating for the time required till an end of measurement, the error in time determination or the timing fluctuation of the gate circuit readily reaches about 100 ps, and these errors are accumulated with the gating operation.

SUMMARY OF THE INVENTION

Accordingly, an object of this invention is to eliminate the above-described difficulties accompanying a conventional time interval measuring method.

More specifically, an object of the invention is to provide a time interval measuring device with high accuracy which, for instance, can measure a period of time of 100 μs with an error of 10 ps.

The foregoing objects and other objects of the invention have been achieved by a time interval measuring device according to the invention for measuring the time interval between a first optical pulse and a second optical pulse, comprising a reference optical clock pulse generator for producing a train of reference optical clock pulses; short time interval measuring means for measuring the time interval between the first optical pulse and a first one of the train of reference to cock pulses which lies close to the first optical pulse, and the time interval between the second optical pulse and a second one of the train of reference optical clock pulses which lies close to the second optical pulse; and means for calculating the time interval between the first and second optical pulses according to the outputs of the short time interval measuring means and the time interval between the first and second reference optical clock pulses.

The nature, principle and utility of the invention will become more apparent from the following detailed description when read in conjunction with the accompanying drawings.

DETAILED DESCRIPTION OF THE PREFERRED EMBODIMENT

Figures 1, 2A, 2B, 2C:
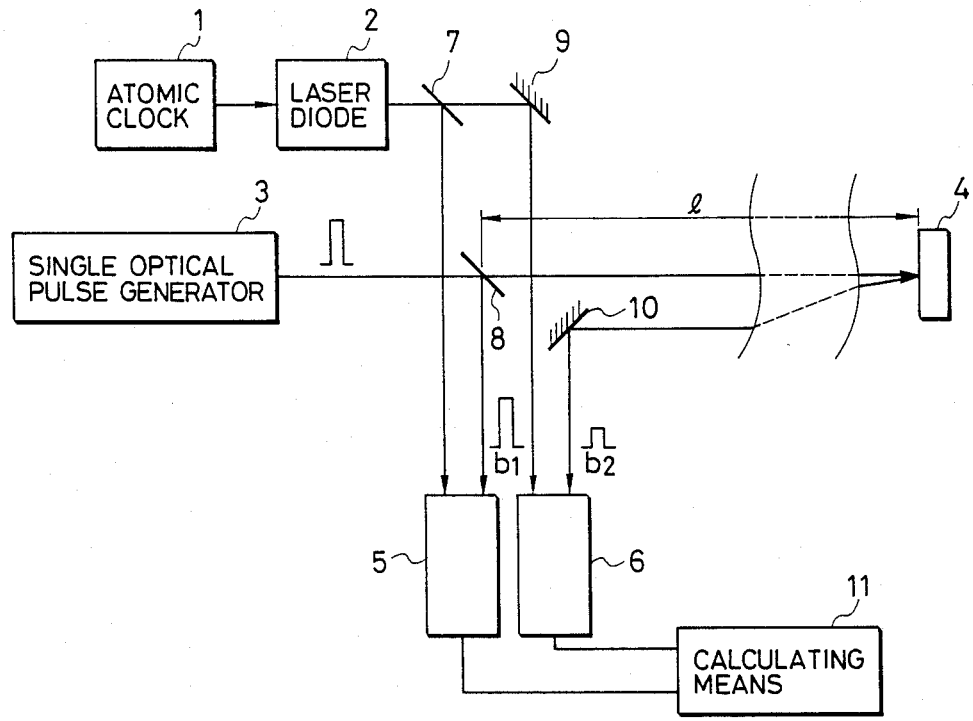
FIG. 1 is an explanatory diagram, partly as a block diagram, showing the arrangement of one example of a time interval measuring device according to this invention which is utilized for the measurement of a distance by way of example.
FIG. 2(A), (B) and (C) are time charts for a description of the operation of the device according to the invention.

By way of example, a time interval measuring device according to this invention will be described with reference to the case where it is utilized for a distance measuring device.

As shown in FIG. 1, an atomic clock 1 and a laser diode 2 form an optical clock pulse train generator for producing a reference optical clock pulse train. The laser diode 2 produces a train of optical clock pulses with an accurate pulse interval (period) T with the aid of the atomic clock 1 as shown in FIG. 2(A).

The optical clock pulses thus produced, being partly reflected by a half mirror 7, are applied to a first streak camera 5. The optical clock pulses passed through the half mirror 7, being reflected by a reflecting mirror 9, are applied to a second streak camera 6.

A single optical pulse generator 3 produces an optical pulse, which is applied to another half mirror 8, where it is split into two parts comprising an optical pulse reflected by the half mirror and an optical pulse passed through it. The former optical pulse, namely, a first optical pulse $b_1$ is applied to the first streak camera 5 which forms first short time interval measuring means. The first streak camera 5 is adapted to measure the short time interval ($Tb_1$) between the first optical pulse b1 and the optical clock pulse (O in FIG. 2(A)) of the train of optical clock pulses which is closest to the first optical pulse $b_1$.

The optical pulse passed through the half mirror 8 is reflected by the surface 4 of an object under measurement which is located at an unknown distance, and again reflected by a reflecting mirror 10, so that the optical pulse is applied, as a second optical pulse $b_2$, to the second streak camera 6 which forms second short time interval measuring means. The second streak camera 6 is adapted to measure the short time interval $Tb_2$ between the second optical pulse b2 and the optical clock pulse i of the train of optical clock pulses (FIG. 2(A)).

The optical pulses and the optical clock pulses appear on the output phosphor screen of the streak cameras as shown in FIG. 2(C).

The time interval $T_m$ between the first optical pulse $b_1$ and the second optical pulse $b_2$ is:

$$T_m = i \cdot T - T_{b_1} + T_{b_2} \tag{1}$$

where i is the integer, T is the reference optical clock pulse interval, $T_{b_1}$ is the short time interval between the reference optical clock pulse (O) and the first optical pulse, and $T_{b_2}$ is the short time interval between the reference optical clock pulse (i) and the second optical pulse.

The time interval $T_m$ is the period of time which elapses from the time instant when the optical pulse passes through the half mirror 8 until it returns to the half mirror 8 after being reflected from the surface 4 of the object positioned at the unknown distance l. Therefore, $T_m = 2l/C$ where C is the velocity of light. Accordingly, the distance l is:

$$l = C\, T_m/2 \tag{2}$$

Reference numeral (11) represents a calculating means for determining the time interval $T_m$ and the distance l according to the equations (1) and (2) which is electrically or optically connected to the streak cameras (5) and (6).

In the above-described embodiment, two streak cameras are utilized. However, the short time interval can be measured with one streak camera. That is, the above-described embodiment is based on the fact that there is a time difference between the arrival of the first optical pulse to the first streak camera and that of the second optical pulse to the second streak camera, and therefore the two streak cameras can be replaced by one streak camera with suitable gate means.

Further, in the above-described embodiment, a streak camera is employed as short time interval measuring means. However, this invention is not limited thereto. For example, an equivalent fast temporal registration device to the streak camera may be used as short time interval measuring means.

In the measurement of distances, the refractive index of the air in which light propagated depends on the variations of temperature, humidity and atmospheric pressure, and therefore sometimes the light velocity varies, thus adversely affecting the measurement. However, this difficulty can be overcome by employment of two or three kinds of optical pulses different in wavelength.

The laser diode according to this invention is driven by the output electrical pulses of the atomic clock or accurate crystal oscillator, and therefore the reference optical clock pulses are generated with considerably high accuracy, further, as the streak cameras are employed as the short time interval measuring means, the short time interval between the first optical pulse and the reference optical clock pulse, and the short time interval between the second optical pulse and the reference optical clock pulse can be read with considerably high accuracy.

The total error in measurement of the device according to this invention is extremely small, because it comprises only the time error of the atomic clock and the measurement error of the streak cameras which have extremely small errors.

In the measurement of the time interval with the electrical circuit according to the conventional method, the operating errors of the circuit itself, being accumulated, make it impossible to achieve the measurement with high accuracy. However, in the case where it is required to measure the time interval with an error of about 100 ps or less, as described above, the method of the invention is much superior to the conventional method.

The device of the invention is applicable to a wide range of technical fields such as for instance the measurement of a time interval. Thus, the industrial effects and merits of the invention should be highly appreciated.

What is claimed is:

1. A time interval measuring device for measuring the time interval between a first optical pulse and a second optical pulse, said device comprising:
   a reference optical clock pulse generator for producing a train of reference optical clock pulses;
   a short time interval measuring means for spatially measuring the time interval between said first optical pulse and a first one of said train of reference optical clock pulses lying close to said first optical pulse, and the time interval between said second optical pulse and a second one of said train of reference optical clock pulses lying close to said second optical pulse; and
   calculating means for determining the time interval between said first optical pulse and said second optical pulse according to outputs of said short time interval measuring means and the reference optical clock pulse interval.

2. The device as claimed in claim 1, said device further comprising a single pulse generator generating an optical pulse, and optical splitting means for splitting said optical pulse into said first and second optical pulses, wherein said first optical pulse is applied directly to said short time interval measuring means, and said second optical pulse is applied to said short time interval measuring means after being reflected from an object disposed at a some distance.

3. The device as claimed in claim 2, wherein said optical splitting means comprises a half mirror and a reflecting mirror.

4. The device as claimed in claim 1, wherein said short time interval measuring means comprises one of a first streak camera and a first equivalent fast temporal registrating device, said one having an input to which said reference optical clock pulses and said first optical pulse are applied, and one of a second streak camera and a second equivalent fast temporal registrating device having an input to which said reference optical clock pulse and said second optical pulse are applied.

5. The device as claimed in claim 1, wherein said short time interval measuring means is a single streak camera having an input to which said reference optical clock pulses are applied and said first and second optical pulses are applied with a time difference.

* * * * *